June 24, 1958 G. J. NORDSTROM 2,840,774
ELECTRIC MOTOR MULTITURN SHAFT POSITIONING MEANS
Filed Jan. 16, 1956
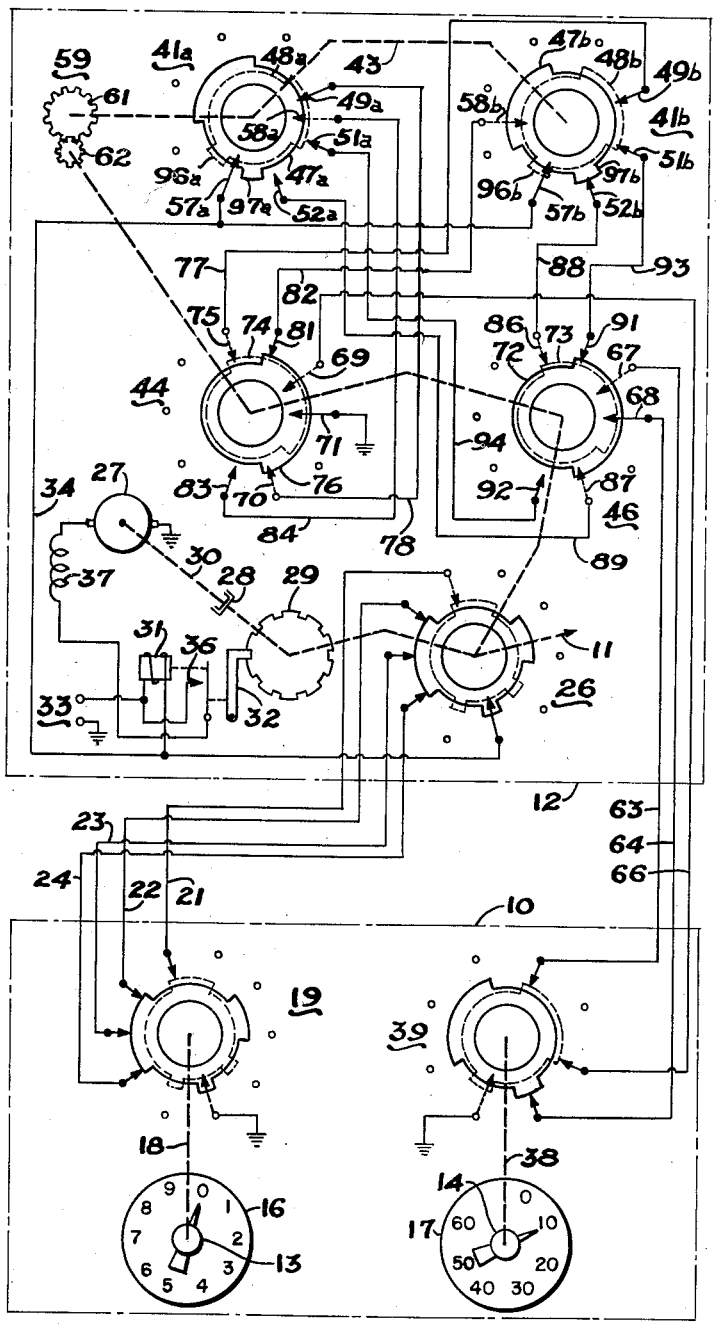
INVENTOR.
GORDON J. NORDSTROM
BY Moody and Goldman
ATTORNEYS

United States Patent Office

2,840,774
Patented June 24, 1958

2,840,774
ELECTRIC MOTOR MULTITURN SHAFT POSITIONING MEANS

Gordon J. Nordstrom, Cedar Rapids, Iowa, assignor to Collins Radio Company, Cedar Rapids, Iowa, a corporation of Iowa Application January 16, 1956, Serial No. 559,187

6 Claims. (Cl. 318—467)

This invention relates to a shaft-positioning system that can position an output shaft to any one of a number of discrete rotational positions lying within a plurality of revolutions of the output shaft.

This invention may utilize in its combination the shaft positioning systems taught and claimed in Patent No. 2,676,289 to A. H. Wulfsberg and H. M. Schweighofer, and Patent No. 2,476,673 to R. W. May and H. M. Schweighofer. These patents each teach seeking switch systems which provide only for the selection of discrete positions within a single revolution of an output shaft, and are called herein "uniturn" systems. Therefore, a "uniturn" system may be distinguished from a "multiturn" system; in that the former seeks rotational positions within a single revolution, while the latter seeks rotational positions within a plurality of revolutions.

Briefly, these patents teach how a minimum number of control wires may be connected between a control station and a remote station, containing the output shaft, to obtain a large number of discrete positions for the output shaft.

However, the present invention can utilize any prior uniturn seeking switch system to accomplish its objective, which is to obtain a number of discrete rotational positions for an output within a plurality of revolutions, while using a single stop-wheel, although the single stop-wheel defines only the discrete rotational positions within a single revolution.

Prior multiturn shaft positioning devices have been obtained by gearing an ultimate output shaft to the stop-wheel positioned output shafts of two or more uniturn devices, such as taught by the above cited patents. However, such gearing to the ultimate output shaft has unavoidable backlash which causes substantial error in the rotational positioning of the multiturn output shaft.

On the other hand, this invention provides a multiturn shaft positioning device which does not have any gearing between its stop-wheel positioned shaft and its ultimate output shaft which are the same. Accordingly, the invention fixes its notched stop-wheel to its ultimate output shaft to obtain the positive and accurate positioning obtained by firmly locking a pawl in the notch of a stop-wheel. This system can provide positioning errors of less than 0.05 of one degree in a plurality of revolutions. Such accuracy would be impossible for a geared ultimate output shaft due to backlash.

The invention uses gearing only in its electrical switching arrangement; and accordingly, its gear members may have a great deal of backlash without in any manner affecting the positioning accuracy of its output shaft.

In order to permit the use of commonly-available rotary switches for all of the switches in this invention, and in order to avoid extremely small tolerances in manufacture, a cycling-switch arrangement is provided. This is caused by the fact that the internal gearing causes a large reduction in the rotational speed of some of the seeking switches. If "non-shorting" contacts are used, an ambiguity will occur which may prevent reliable operation, due to the fact that some of the switches often travel very slowly and intermittent open-circuits will occur during rotation of the rotor shortly before rotor projections reach respective stator contacts. Such intermittent open-circuits cause false nulls for the seeking switch system which may prevent further operation of the system. Even where "maximum-tolerance" contacts are used, difficulty may be encountered because of slight misalignments that sometimes occur in the stator contacts and in rotor proportioning of wafer type switches.

The present invention avoids these difficulties by providing dual seeking-switches with an intermediate cycling switch arrangement that alternates seeking-switch operation between the dual seeking-switches. As a result, shorting type contacts can be used without ambiguity.

It is, therefore, an object of this invention to provide a multiturn shaft positioning system which accurately provides for its ultimate output shaft a large number of discrete positions that are spaced by a fraction of a revolution and may lie within any one of a plurality of ultimate output shaft revolutions.

It is another object of this invention to provide a multiturn shaft positioning apparatus which obtains as much accuracy in positioning its output shaft as is obtained in any uniturn shaft positioning apparatus.

It is still another object of this invention to provide a multiturn shaft positioning system which can utilize gears having a relatively large amount of backlash in its switching arrangement without the backlash affecting the accuracy of the discrete positions of its output shaft.

It is a further object of this invention to provide a multiturn shaft positioning system which permits the use of shorting contacts in some of its rotary swiches without ambiguity.

The invention combines in a novel manner any two uniturn shaft positioning devices, such as the type taught in the above cited patents. One of the uniturn systems will determine the discrete positions of the multiturn output shaft within each single revolution and is called herein, the first uniturn system. The other uniturn system will determine the number of whole revolutions of the output shaft and is called herein, the second uniturn system. Each uniturn system may provide any number of required positions. However, where a decade arrangement is desired, the first uniturn system will obtain ten discrete positions. The number of discrete output positions for the multiturn output shaft will be the product of the number of positions initially provided by the uniturn systems.

A gear transmission is used to couple the seeking switches of the two uniturn systems, and the gear ratio is determined by the number of stator contacts on the control switch of the second uniturn system. Thus, a seeking switch of the second uniturn system will rotate one increment, while the seeking switch of the first uniturn system rotates a full revolution.

Ambiguities in switching for the second uniturn system are avoided by providing it with dual seeking switches. The rotors of the dual seeking switches are angularly fixed to the second uniturn output shaft, and a rotational difference of one-half interval plus any number of whole intervals is provided in the fixed angular positioning of their stator contacts.

A cycling switch arrangement is provided to switch between the dual seeking switches. The cycling switch may have a total number of separate rotors equal to the number of wires and any common ground and/or power connections connected to the control switch of the second uniturn system. Each cycling switch rotor is continuously engaged by a sliding contact which connects to a different one of these wires; and each cycling switch has a pair of oppositely positioned stator contacts which connect to respective stator contacts on opposite sides of the dual seeking switches to alternately connect the control wires between the dual seeking switches and avoids difficulties caused by overlapping rotor contacts.

Further advantages, features and objects of this invention will be apparent to a person skilled in the art upon further study of the specification and the single figure, which shows a preferred embodiment.

Now referring to the invention in more detail, a control station 10 is provided to select the discrete rotational positions for a multiturn output shaft 11 located in a remote station 12. The stations may be widely separated or, on the other hand, may be close together as a particular situation may require.

The control station includes a pair of control knobs 13 and 14 which cooperate with dials 16 and 17, respectively, to select the discrete output positions for ultimate output shaft 11. Knob 14 selects a required one of the whole revolutions for multiturn output shaft 11; while the other knob 13 determines a required fractional rotational position within the selected revolution. Thus, in the figure, knob 14 selects among seven whole revolutions, while the other knob 13 selects any one of ten fractional rotational positions within a chosen one of the whole revolutions. Dial 16 cooperates with knob 13 and indicates the ten fractional positions by the numbers, zero through nine, and the other knob 14 indicates the whole revolutions by the numbers, zero through 60.

A shaft 18 connects knob 13 to a rotary control switch 19 which is connected by wires 21, 22, 23 and 24 to a seeking switch 26 located in remote station 12 to provide a first uniturn system, which has an output shaft common with the muliturn output shaft. The first uniturn system may comprises a shaft positioning system as taught in Patent No. 2,476,673 cited above. Since this uniturn system is explained in the prior art, it will not be explained in detail herein; and it is obvious that the ten position system shown is merely exemplary and a seeking switch system with any number of positions may be provided.

Multiturn output shaft 11 is connected directly to seeking switch 26 and is driven by a motor 27 through a clutch 28. A stop-wheel 29 is also fixed to shaft 11 and has ten notches which cooperate with a pawl 32 to lock multiturn shaft 11 in any one of ten rotational positions within a given whole revolution.

A relay 31 has an armature which actuates pawl 32; and relay 31 is connected betwen a power source 33 and a common lead 34 in a well known manner as taught in the cited patents. Relay 31 has normally-open contacts 36 which are connected serially between power source 33, motor 27, and its field 37. Thus, motor 27 is energized when relay 31 is energized.

The other control knob 14 is connected by a shaft 38 to another control switch 39 which selects a required one of a plurality of whole revolutions of output shaft 11.

Control switch 39 cooperates with the dual seeking switches 41a and 41b, which have their rotors fixed to a shaft 43, to provide the second uniturn system utilized by the invention. The second uniturn system may be designed from any known seeking switch system, such as taught in Patent No. 2,476,673 cited above. Thus, a known uniturn system is selected which provides a required number of positions within a single revolution, wherein the number equals or exceeds the total number of revolutions required for multiturn output shaft 11. In the embodiment shown in the figure, less than the maximum number of positions are used. This seeking switch system is then altered as taught by this invention wherein dual seeking switches 41a and 41b and cycling switches 44 and 46 are utilized.

Each of the dual seeking switches 41a and 41b may be identical in their stator and rotor construction. Each seeking switch 41a and 41b may be comprised of a double wafer, wherein each wafer has one rotor 47 shown in solid lines, and a second rotor 48 insulated therefrom and shown in dotted lines. In the figure, each rotor has a stator having eight equally-spaced peripheral contacts. However, only three adjacent of the stator contacts 49, 51 and 52 are used in this embodiment. Contacts 49b, 51b and 52b engage the respective outer peripheries of their solid line rotor 47b and dotted line rotor 48b. Similarly, the other seeking switch 41a includes contacts 49a, 51a, and 52a, which engage the respective peripheries of its solid line rotor 47a and its dotted line rotor 48a.

In addition to the three peripheral stator contacts, each seeking switch 41a and 41b has two continuously-engaging contacts. Solid-line contact 57b continuously engages solid-line rotor 47b; and dotted-line contact 58b continuously engages dotted-line rotor 48b. Similarly, with seeking switch 41a, solid-line contact 57a and dotted-line contact 58a continuously engage its respective rotors.

The construction of each seeking switch 41a and 41b may be done as taught in the above cited patents for their seeking switches.

However, the stators of the two seeking-switches 41a and 41b are staggered angularly with respect to shaft 43. The angle may correspond to one-half the interval between adjacent contacts, which in the figure requires a spacing of 22½ degrees. Additionally however, the angular spacing may be any number of whole intervals (45 degrees per whole interval in the figure) plus one-half an interval. In the figure, no whole intervals are used but only the one-half interval. In some cases, it may be desirable to also use several whole intervals in order to angularly position the stator contacts of the two seeking switches with respect to each other to prevent difficulties in wiring.

A gear transmission 59 is used which has a transmission ratio equal to the maximum number of stator contacts on one of the seeking switches 41a or 41b, which is eight in the figure. Thus, transmission 59 has a gear ratio of eight to one in which its larger gear 61 is fixed to shaft 43 and its smaller gear 62 is fixed to the multiturn output shaft 11. Thus, shaft 43 will rotate one-eighth of a revolution for each revolution of the muliturn shaft.

It is conceivable that only a single seeking switch could be used with control switch 19, rather than the dual seeking-switches shown; however, difficulties in switching would be encountered due to the fact that its shaft 43 rotates slowly compared to the speed of multiturn shaft 11 (eight times as slow in the figure). In this conceivable case, difficulties will arise in the making and breaking of contacts between the rotor and stator in the seeking switch, particularly where the general "non-shorting" contacts are used.

To prevent such switching difficulties, the invention provides a cycling switch system which includes cycling switches 44 and 46. Cycling switches 44 and 46 are each dual tap switches, including a dotted line portion insulated from a solid line portion. It is important to note that the total number of single tap switches is equal to the number of control wires 63, 64, 66 plus the ground connection. Each of the control wires 63, 64, 66 and the ground terminal connects to a different one of the continuously sliding contact 67, 68, 69 or 71, which engages a respective cycling switch rotor 72, 73, 74 and 76. Also, each cycling switch rotor has two peripheral stator contacts, which are located approximately 180 degrees apart; and opposite stator contacts of each rotor are connected to opposite seeking switches 41a and 41b, respectively. For example, in regard to continuously-grounded solid-line cycling rotor 76, one peripheral stator contact 81 is connected by a wire 82 to continuously-engaging stator contact 58b of seeking switch 41b; and the opposite peripheral stator contact 83 of cycling rotor 76 is connected by another lead 84 to a like continuously-engaging contact 58a of the other seeking switch 41a. In a similar manner, dotted-line cycling rotor 74 has opposite peripheral contacts 75 and 76, which are connected by respective leads 77 and 78 to comparable stator contacts 49a and 49b of the respective seeking switches 41a and 41b.

Also, in a like manner, the opposite peripheral contacts 86 and 87 of another dotted-line cycling rotor 73 are connected respectively to comparable stator contacts 52b and 52a on the seeking switches 41b and 41a by wires 88 and 89. And again, the fourth cycling rotor 72, shown in solid lines, has opposite peripheral stator contacts 91 and 92, which connect respectively to the seeking-switch stator contacts 51b and 51a by means of leads 93 and 94.

The cycling rotors are all fixed to multiturn output shaft 11; and their fixed angular positions with respect to each other are not critical, as long as, at any one time, they connect all of the control wires 63, 64 and 66 and ground to one of the seeking switches 41a or 41b. The rotor periphery of each cycling rotor is made slightly less than 180 degrees, in order to connect sequentially the control wires 63, 64 and 66 and ground to one of the seeking switches for approximately one-half a revolution of the multiturn output shaft, which corresponds to one-half of an interval for each of the seeking switches 41a and 41b.

Thus, the cycling switches connect the control wires and ground to seeking switch 41a for one-half revolution of seeking shaft 11 (which corresponds to one-half interval of rotation for the seeking switches 41a and 41b) and to the other seeking switch 41b for the other one-half revolution of seeking shaft 11 (which is the remaining one-half revolution of seeking shaft 11.)

As a result, the peripheral projections on the rotors of the dual seeking switches may have more angular length than is otherwise permitted. They are non-shorting-type contacts which do not cause any undesired open-circuits because of the action of the cycling switches. For example, small projections 96a, 97a, 96b and 97b on the respective seeking switches should each exceed one-half an angular interval but may be substantially less than a whole interval. This permits a large tolerance in workmanship. There will be times when some of these projections simultaneously engage corresponding contacts, such as 97a and 97b, for example. However, the cycling switch arrangement maintains each of the undesirably connected stator contacts in a disconnected state until it is required that it be connected, in which case the cycling switch connects them.

The motor controlling relay 31 is also connected in series with the dual seeking switches 41a and 41b by means of a lead 34 which connects to the respective continuously-engaged contacts 57a and 57b. Thus, motor 27 continues rotation of both shaft 43 and multiturn shaft 11 until both seeking switch systems find null positions; where relay 31 becomes de-energized and the pawl 32 drops into the selected notch of stop-wheel 29 to firmly fix the output shaft at an exact rotational position.

Although shaft 43 slightly over or under drives multiturn shaft 11 to the selected whole revolution, due to backlash in gear transmission 59, the final position of multiturn shaft 11 is controlled by the fractional rotational setting of stop-wheel 29. Accordingly, the backlash in gear transmission 59 has no effect upon the selected position of multiturn shaft 11.

Limit switches (not shown) are required at the extremes of multiturn shaft rotation to reverse motor 27, where the uniturn shaft positioning systems used in the invention operate unidirectionally. In such case, one extreme rotational position is used as a "homing" or "starting" position for the shaft positioning sequence; and the shaft is returned to the home position by the limit switch system when the opposite extreme shaft position is reached so that a new sensing cycle may be started by the invention.

The dials in the figure illustrate the system at position 10. Let it be assumed that position 23 is desired. Then, knob 14 is set to position 20, and knob 13 to position 3. It makes no difference which knob is positioned first, or whether both are positioned simultaneously.

By way of example, it is assumed that knob 14 is first moved to position 20. This rotates control switch 39 to destroy the initial open-circuited condition illustrated moved to position 20. This rotates control switch 39 When knob 14 is turned to position 20, a closed circuit is provided through seeking switch 41b, lead 34, and relay 31 to lift pawl 32 and to energize motor 27. (Initially, cycling switches 44 and 46 connected seeking switch 41b to control switch 39.) Output shaft 11 is thus rotated by motor 27.

Due to the speed reduction from gear 62 to gear 61, seeking switches 41a and 41b turn at a relatively low rate of speed, which could cause arcing at its contacts, except for the operation of cycling switches 44 and 46, which rotate eight times faster due to the gear ratio. Thus, every time the cycling switches 44 and 46 rotate one-half revolution, seeking-switch operation is shifted from 41b to 41a or vice versa.

The above-described half-interval (22½°) angular staggering of switches 41a and 41b on shaft 43 causes a sequential duplication in the operation of these switches, so that they both can see an open-circuit at the required position of shaft 43. This avoids ambiguity in the dual seeking-switch operation but enables the quick alternate shifting of seeking-switch operation to cause a sequence of quick breaks-and-makes at the cycling switch contacts. This greatly reduces contact burning due to arcing at the seeking switches because of their slow speed, and greatly extends their life and reliability. When position 20 is found by the respective seeking switches 41a and 41b, an open circuit is provided which de-energizes relay 31 to stop motor 27 and drop pawl 32 into the appropriate notch in stopwheel 29.

Then knob 13 with control switch 19 is moved to position 3. Thus, a closed circuit is created in the uniturn system of control switch 19. The closed circuit includes relay 31 which is thereby energized to lift pawl 32 from stop-wheel 29 and to start motor 27 which rotates the stop-wheel and seeking switch 26 until it finds an open circuit at position 3 to open the relay circuit, deenergize motor 27, and permit stop-wheel pawl 32 to fall into an aligned notch which locks the output shaft at a required position.

Output shaft 11 is, therefore, locked by the pawl at position 23.

It is, therefore, apparent that this invention provides a multiturn shaft positioning system which can obtain a large number of discrete output shaft positions within a plurality of revolutions of the multiturn shaft with positive angular accuracy, wherein there is no error due to backlash in an internally used gear system, although the gear system has a relatively large amount of backlash. It is further apparent that this invention provides a cycling system which permits low-tolerance contacts to be used without affecting the accuracy or reliability of the system.

While a particular form of the invention has been shown and described, it is to be understood that the invention is capable of many modifications. Changes, therefore, in construction and arrangement may be made without departing from the full scope of the invention as given by the appended claims.

I claim:

1. Multiturn shaft positioning means comprising, a first uniturn seeking switch system including a first control switch and a first rotary seeking switch, a second uniturn seeking switch system including a second control switch and a pair of seeking switches, an output shaft fixed to the rotor of said first seeking switch, a second shaft fixed to the rotors of said pair of seeking switches, a gear transmission having a transmission ratio equal in number to the stator contacts of one of said pair of seeking switches, said transmission coupled in a reduction arrangement from said second shafts to said output shaft, a plurality of cycling switches having rotors equal in number to the control wires and ground connection of said second control-switch, with each cycling switch having a continuously-engaging contact connected to a different one of said control wires and ground connection, each cycling switch also having a pair of opposite stator contacts, and an approximately semicircular rotor periphery that sequentially engages those contacts, the cycling switches each having one of their opposite contacts engaged at approximately the same rotational movement of said output shaft, the cycling switch contacts which are engaged at one time connected in the required seeking switch manner to one of said pair of seeking switches, and the opposite cycling switch contacts connected in the required seeking switch manner to the other of said pair of seeking switches.

2. Multiturn shaft positioning means comprising first and second uniturn seeking switch systems, each including a control switch, a rotary seeking switch, and a shaft fixed to the rotor of its seeking switch, transmission means coupling the output shaft of said second system to the output shaft of said first system for reducing the rotation of said second system's shaft by a ratio of M/1 where M is the maximum number of possible positions for said second system's output shaft, driving means actuated by energization of any of said seeking switch systems, and said driving means coupled to one of said output shafts, whereby said first output shaft operates in a multiturn manner.

3. A multiturn shaft positioning means as defined in claim 2 wherein an additional seeking switch is provided for said second seeking switch system and is substantially the same as the first-mentioned seeking switch of said second seeking switch system, the rotors of said seeking switches of the second seeking system fixed to the output shaft of said second-seeking system, the stators of said second system annularly displaced by approximately one-half plus an optional integer number of rotational intervals, a cycling switch system including M number of cycling switches in which M is the number of control wires and ground connections required by said second seeking switch system, each of said cycling switches having a continuously-engaging contact connected to a different one of the control wires and ground connection of said second system, each of said cycling switches also including opposite stator contacts sequentially engaged during opposite one-half revolutions of said first seeking switch system output shaft, one-half of said cycling stator contacts engaged for one-half a revolution of said first seeking switch system output shaft and the opposite stator contacts engaged for the remaining one-half revolution, those cycling stator contacts engaged at one time connected to one of said seeking switches of said second system and the remaining cycling switch stator contacts connected to the other seeking switch of said second system.

4. Multiturn shaft positioning means comprising first and second multiturn seeking switch systems, each system including a control switch, an output shaft, and a seeking switch arrangement fixed to its output shaft, transmission means coupling the output shaft of said first system to the output shaft of said second system respectively in a reduction arrangement having a ratio of M/1 where M is the maximum number of possible positions for the output shaft of said second system, said seeking switch arrangement for said system having a dual arrangement with substantially identical seeking switches, driving means actuated by energization of said seeking switch systems, said driving means coupled to one of said output shafts, cycling switch means interposed between the control switch and seeking switch arrangement of said seeking switch system for alternately connecting the control switch to one of its seeking switches, wherein the dual seeking switches are sequentially connected for alternate one-half revolutions of said first system's output shaft, whereby the output shaft of said first system operates in a multiturn manner in response to the settings of the control switches of both said systems.

5. Multiturn shaft positioning means comprising a first uniturn seeking switch system having a control switch, an output shaft and a rotary seeking switch coupled to said output shaft, a second uniturn seeking switch system having a control switch, a second output shaft and a dual seeking switch arrangement fixed to said second shaft, transmission means coupling the first output shaft to the second output shaft with a reduction arrangement determined by the permissible number of equally-spaced stator contacts on one of said second system seeking switches, driving means coupled to said first output shaft, a stopwheel fixed to said first shaft having notches which correspond to the rotational positions provided by said first seeking switch system, a pawl member for engaging the notches in said stopwheel to lock said first shaft at a selected rotational position, means for disengaging said pawl member when any of said seeking switch systems are energized, whereby said first output shaft operates in a multiturn manner.

6. Multiturn shaft positioning means comprising a first uniturn seeking switch system having a uniturn seeking switch arrangement fixed to its output shaft, a second uniturn seeking switch system having dual seeking switches fixed to its second output shaft, reduction gear means connecting said first shaft to said second shaft and having a gear reduction ratio equal in number to the maximum number of possible positions for said second system output shaft, a cycling switch arrangement for sequentially connecting the control wires of said second seeking switch system to its dual control switches in response to rotation of said first system output shaft, a power source, relay means connected serially between said power source and each of said seeking switch systems, driving means coupled to said first system output shaft and actuated by energization of said relay means, a stopwheel formed with notches corresponding to the rotational positions provided by said first seeking switch system, a pawl means for engaging the notches of said stopwheel and disengaged by said relay means when energized, said first output shaft providing multiturn operation in response to the control means of said first and second uniturn seeking switch systems without positional error due to the backlash of said reduction gear means.

References Cited in the file of this patent

UNITED STATES PATENTS 2,721,967    Olin _____ Oct. 25, 1955